May 13, 1930. J. L. LONG ET AL 1,758,754

PRESSURE ARM ATTACHMENT FOR BREAD WRAPPING MACHINES

Filed April 28, 1928

John L. Long and
Robert Owen
INVENTORS

BY Victor J. Evans
ATTORNEY

WITNESS: John Duncan

Patented May 13, 1930

1,758,754

UNITED STATES PATENT OFFICE

JOHN L. LONG AND ROBERT OWEN, OF MADISONVILLE, KENTUCKY

PRESSURE-ARM ATTACHMENT FOR BREAD-WRAPPING MACHINES

Application filed April 28, 1928. Serial No. 273,614.

Our present invention has reference to an improved sealing means for wrapping machines and is particularly directed as an attachment for machines for wrapping loaves of bread of irregular contour with waxed paper or with ordinary gummed wrapping paper and consists in the construction and combination which will be hereinafter fully described and claimed.

Figure 1:
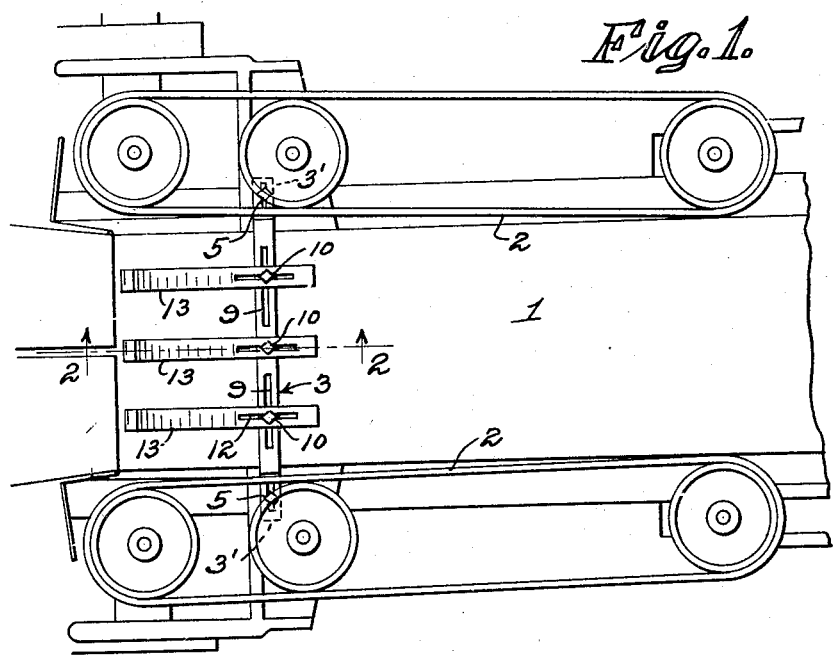
Figure 1 is a plan view of a sufficient portion of a loaf bread wrapping machine to illustrate the application of the improvement.
Figure 2:
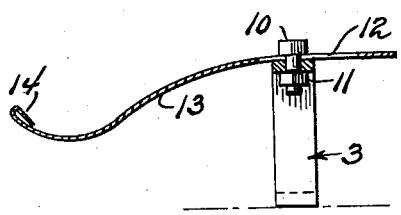
Figure 2 is a sectional view approximately on the line 2—2 of Figure 1.
Figure 3:
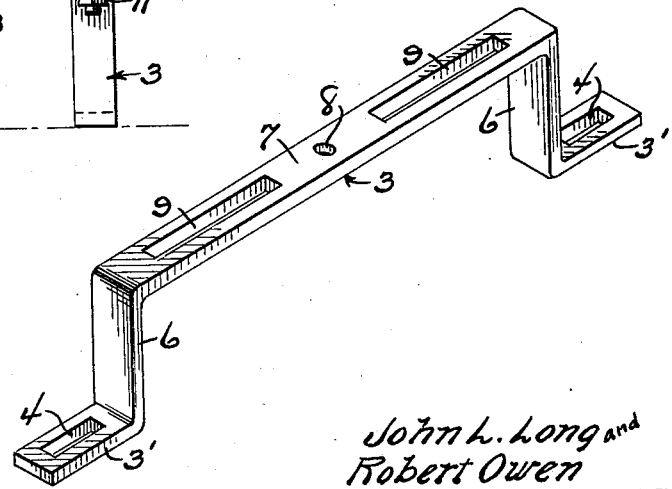
Figure 3 is a perspective view of the substantially U-shaped base of the improvement.

As our improvement is applicable to various types of loaf bread wrapping machines, we have in Figure 1 of the drawings illustrated a conventional form of such devices and have not resorted to the illustrations of details of construction. As is well known in these types of machines, the bread after being wrapped is arranged on a conveyor belt which in Figure 1 of the drawings, is indicated by the numeral 1 and is directed between side belts 2 and generally below a presser belt, not shown. The wrapped loaf of bread at the time it is passed through the sealer, with the ordinary constructions of such machines, is not uniformly sealed at both the bottom and ends. This is occasioned by the irregular shape of the loaf or loaves of bread and by the inability of the thrust of the sealing fingers to properly engage with the folded edges of the wrapper, and consequently only a portion of the seam is thereby engaged. Our improvement does not in any manner alter the construction of the bread wrapping machine, but materially aids in the pressure of the wrapped loaf of bread to force the same against the fingers so that the wrapper will be effectively sealed around the loaf of bread. On the sides of the frame, slightly to the rear of the presser fingers, not shown, we removably secure a substantially U-shaped frame, which is broadly indicated by the numeral 3. The frame has its parallel sides offset outwardly to form the same with feet 3' and the said feet are slotted, as at 4, and through these slots there are passed the shanks of headed bolts 5 which permit of the frame being laterally adjusted on the machine. The sides 6 of the frame 3 are disposed outwardly with respect to the inner leads of the side belts 2 and do not contact therewith. The top 7 of the frame 3 is provided with a central opening 8 and with elongated side openings 9. Through each of these openings there is passed bolts 10 which are engaged by suitable nuts 11, the said nuts also passing through elongated slots 12 in arched spring presser fingers 13, the outer ends of the said fingers being rounded upwardly and formed with lips 14. The wrapped loaves of bread passing through the spring fingers 13 are urged thereby by the presser or sealing fingers of the machine so that the wrapper is effectively sealed around the loaf or loaves of bread.

The construction is extremely simple and as stated may be easily attached to any ordinary bread sealing machine. The spring presser fingers 13 are longitudinally adjusted with respect to the supporting frame 3 and the outer or end fingers 3 are also laterally adjusted on said frame, so that the fingers will be properly brought to engage with a wrapped loaf of bread to seal the wrapper thereof.

Having described the invention, we claim:

An attachment for bread wrapping machines which is designed to contact with and exert a pressure upon the wrapped loaf of bread after the same passes through the sealer of the machine to insure a uniform sealing of the wrapper upon both the bottom and ends of the loaf; comprising a substantially inverted U-shaped frame supported upon the frame of the bread wrapping machine outward of the sealer thereof, laterally and longitudinally adjustable spring presser fingers supported on the U-shaped frame, each of said fingers comprising a downwardly arched member whose outer ends are rounded outwardly and merge into substantially rounded lips.

In testimony whereof we affix our signatures.

JOHN L. LONG.
ROBERT OWEN.